US 7,493,491 B2

(12) United States Patent
Ootsuka et al.

(10) Patent No.: US 7,493,491 B2
(45) Date of Patent: Feb. 17, 2009

(54) SERVER, A TERMINAL APPARATUS AND AN IMAGE MANAGEMENT METHOD

(75) Inventors: Takeshi Ootsuka, Kanagawa (JP); Ikuo Yoshida, Kanagawa (JP); Koichi Nagoshi, Kanagawa (JP); Kiyohiko Honda, Tokyo (JP); Takayuki Fukushima, Tokyo (JP)

(73) Assignee: Panasonic Communications Co., Ltd., Tokyo (JP)

( * ) Notice: Subject to any disclaimer, the term of this patent is extended or adjusted under 35 U.S.C. 154(b) by 677 days.

(21) Appl. No.: 10/743,466

(22) Filed: Dec. 23, 2003

(65) Prior Publication Data

US 2004/0139326 A1 Jul. 15, 2004

(30) Foreign Application Priority Data

Dec. 27, 2002 (JP) ............................. 2002-379056

(51) Int. Cl.
*H04L 9/00* (2006.01)
*G06F 7/00* (2006.01)
*G06F 17/30* (2006.01)
*B42D 15/00* (2006.01)
*G06K 9/34* (2006.01)

(52) U.S. Cl. ........................... 713/176; 707/9; 283/113; 382/176

(58) Field of Classification Search ................. 283/113; 382/176; 713/176; 707/9
See application file for complete search history.

(56) References Cited

U.S. PATENT DOCUMENTS

| 4,803,614 | A | | 2/1989 | Banba et al. | |
|---|---|---|---|---|---|
| 5,537,626 | A | * | 7/1996 | Kraslavsky et al. | ............ 710/8 |
| 5,634,012 | A | * | 5/1997 | Stefik et al. | ................... 705/39 |
| 5,643,012 | A | * | 7/1997 | Mai et al. | .............. 439/620.29 |
| 5,825,892 | A | * | 10/1998 | Braudaway et al. | ........... 380/51 |
| 6,148,333 | A | * | 11/2000 | Guedalia et al. | ............. 709/219 |
| 6,823,075 | B2 | * | 11/2004 | Perry | .......................... 382/100 |
| 7,098,931 | B2 | * | 8/2006 | Patterson et al. | ............. 345/634 |
| 7,130,442 | B2 | * | 10/2006 | Braudaway et al. | ......... 382/100 |
| 2001/0008557 | A1 | * | 7/2001 | Stefik et al. | .................. 380/202 |
| 2001/0054152 | A1 | * | 12/2001 | Nakao et al. | ................. 713/182 |
| 2002/0016921 | A1 | * | 2/2002 | Olsen et al. | .................. 713/200 |
| 2002/0059238 | A1 | * | 5/2002 | Saito | .............................. 707/9 |
| 2002/0143649 | A1 | * | 10/2002 | Wise | ............................ 705/26 |

(Continued)

FOREIGN PATENT DOCUMENTS

EP 1202149 5/2002

(Continued)

OTHER PUBLICATIONS

English language Abstract of JP 2002-342292.

(Continued)

*Primary Examiner*—Kristine Kincaid
*Assistant Examiner*—James Turchen
(74) *Attorney, Agent, or Firm*—Greenblum & Bernstein, P.L.C.

(57) ABSTRACT

A server stores original data without a water-mark. When a user at a terminal apparatus connected with the server requests the server to display the original data on a display of the terminal apparatus, the server transforms the original data into an image data. Then the server adds a water-mark to the image data and transmits the image data with the water-mark to the terminal apparatus.

2 Claims, 17 Drawing Sheets

U.S. PATENT DOCUMENTS

2002/0154144 A1* 10/2002 Lofgren et al. .............. 345/634
2003/0033529 A1* 2/2003 Ratnakar et al. ............ 713/176

FOREIGN PATENT DOCUMENTS

| | | |
|---|---|---|
| EP | 1231546 | 8/2002 |
| JP | 10-191017 | 7/1998 |
| JP | 11-298717 | 10/1999 |
| JP | 2001-318771 | 11/2001 |
| JP | 2002-342060 | 11/2002 |
| JP | 2002-342292 | 11/2002 |
| JP | 2002342060 A * | 11/2002 |

OTHER PUBLICATIONS

English language Abstract of JP 10-191017.
English language Abstract of JP 2002-342060.
English language Abstract of JP 11-298717.
English language Abstract of JP 2001-318771.

* cited by examiner

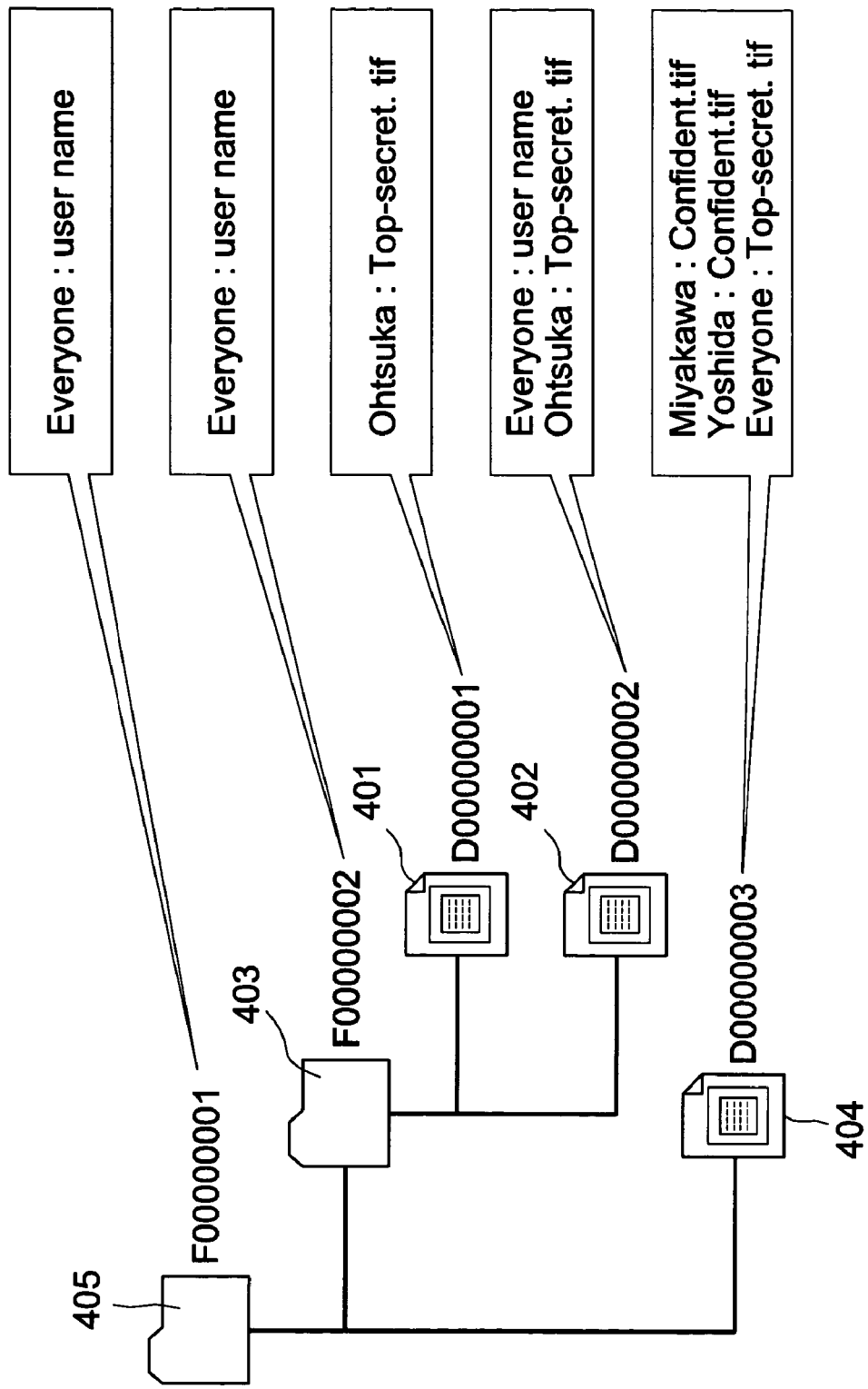

Fig.5

Document information table 300

| Document ID 501 | user ID 502 | attribute 503 | file name 504 | Location 505 | Page 506 |
|---|---|---|---|---|---|
| D00000001 | Ohtsuka | data file | Top-secret.tif | top left :30:30 | Top |
| F00000001 | Everyone | user name | | bottom left:30:250 | ALL |
| D00000002 | Everyone | user name | | top right :180:30 | ALL |
| D00000002 | Ohtsuka | data file | Confident.tif | bottom right:180:250 | Top |
| D00000003 | Everyone | data file | Top-secret.tif | top right :180:30 | ALL |
| D00000003 | Miyakawa | data file | Confident.tif | center : 100:130 | Top |
| D00000003 | Yoshida | data file | Confident.tif | top left :30:30 | Top |
| F00000002 | Everyone | user name | | top right :180:30 | ALL |

Fig.6

User management information table 400

| User ID | Name |
|---------|------|
| Ohtsuka | Taro OHTSUKA |
| Miyakawa | Hanako MIYAKAWA |
| Yosida | Ichiro YOSHIDA |

502 — User ID column
601 — Name column

Fig.7

Document management information table 500

| Document ID | Edition number | Folder ID | Date | Maker | Document name |
|---|---|---|---|---|---|
| D00000001 | 1 | F00000002 | 2002/11/22 14:14:14 | Ohtsuka | an outline for a design |
| D00000002 | 1 | F00000002 | 2002/11/22 15:15:15 | Ohtsuka | a specification for a design |
| D00000003 | 1 | F00000001 | 2002/11/22 16:16:16 | Yoshida | a specification for a test |

Fig.8

Access right information table 600

| Document ID 501 | User ID 502 | Access right 801 |
|---|---|---|
| D00000001 | Everyone | Full - access |
| D00000002 | Everyone | Full - access |
| D00000003 | Ohtsuka | Reference |
| D00000003 | Yoshida | Reference·Renew·Print |
| D00000003 | Miyakawa | Reference·Print |

Fig.11

| Process time | User ID | Host | Process content | Document ID | Edition | Pages | Number of copies |
|---|---|---|---|---|---|---|---|
| 2002/10/10 10:10:30 | Ohtsuka | 192.168.0.32 | Connect | | | | |
| 2002/10/10 10:10:31 | Ohtsuka | 192.168.0.32 | Search | | | | |
| 2002/10/10 10:10:35 | Ohtsuka | 192.168.0.32 | Reference | D00000001 | 1 | 1 | |
| 2002/10/10 10:10:40 | Ohtsuka | 192.168.0.32 | Print | D00000001 | 1 | 1 | 1 |
| 2002/10/10 10:10:40 | Ohtsuka | 192.168.0.32 | Print | D00000001 | 1 | ALL | 5 |
| 2002/10/10 10:10:50 | Ohtsuka | 192.168.0.32 | Disconnect | | | | |
| 2002/10/10 10:12:30 | Miyakawa | 192.168.0.30 | Connect | | | | |
| 2002/10/10 10:12:31 | Miyakawa | 192.168.0.30 | Search | | | | |
| 2002/10/10 10:12:35 | Miyakawa | 192.168.0.30 | Reference | D00000001 | 1 | | |
| 2002/10/10 10:12:50 | Miyakawa | 192.168.0.30 | Disconnect | | | | |

Fig.16 top-secret

Document Server a specification for the design eighth edition October 2002

Fig.17

Document Server a specification for the design eighth edition October 2002

SERVER, A TERMINAL APPARATUS AND AN IMAGE MANAGEMENT METHOD

BACKGROUND OF THE INVENTION

1. Field of the Invention

The present invention relates to a server, a terminal apparatus and an image management method that adds a water-mark to document data.

2. Description of Related Art

This application is based on the Japanese Patent Application No. 2002-379056 filed on Dec. 27, 2002, entire content of which is expressly incorporated by reference herein.

As noted in the present application, a water-mark means a word such as e.g. "confidential" or another indication that is utilized to keep document data secret or to indicate another restricted status of the document data.

Related Art Japanese Patent Laid Open Publication 2001-318771 (Page 4, left column) discloses a printer server that obtains a print job from a client apparatus. The client apparatus is connected to the same network as the printer server. The printer server requests a printer to perform the print job. After the printer server adds a water-mark such as "confidential" to document data that is transferred from the client apparatus, the printer server instructs a printer to print the document data with the water-mark.

In the related art, the print server analyzes a PDL data in the print job. When the printer server find a key word such as "customer" in a document name of the PDL data, the printer server judges that the PDL data is confidential. When the PDL data is confidential, the printer server takes information customized for a particular client, from the print job. The printer server converts the information into a PDL data and sets the converted PDL data as a water-mark. Then the printer server combines the PDL data of the document data with the PDL data of the water-mark. After that, the printer server requests the printer to print the document data with the water-mark based on the combined PDL data.

The print server can pre-store a PDL data of the water-mark and can add the PDL data of the water-mark to the PDL data of document data, instead of above information customized for a particular client.

However, the above described related art has the following problems.

The printer server combines the PDL data of the document data with the PDL data of the water-mark, and then the printer generates the document data with the water-mark based on the combined PDL data. Thus, the water-mark appears only on a printed paper. In the other words, when a client see an original image of the document data on a display section of a personal computer before the document data is printed out, the original image without the water-mark can appear on the display section of the personal computer. This means that the client can edit the original image and the client can transfer the original image without the water-mark to another user. Therefore, the related art can not maintain a secret status of the original image.

The related art requires a printer to have a capability of providing the water-mark. However, not all the printers have the capability of providing the water-mark. When a client uses a printer that does not have a capability of providing the water-mark, an original image that must be maintained in a secret status will be printed without the water-mark. Therefore, the related art can not protect a confidential document from being released to an inappropriate party.

As above described, the related art determines whether a document data is confidential or not, based on the document name of the PDL data. However, the document name is easily changed by anyone. If someone deliberately changes the document name, a confidential document can be printed out without the water-mark. Also before a client adds a water-mark to an image, the client has to know which document names the print server recognizes as keywords indicating confidentiality. If the client inputs a wrong key word, a confidential document will be printed out without the water-mark. Therefore, the related art can not protect a confidential document from being released to an inappropriate party.

SUMMARY OF THE INVENTION

This present invention is provided to address the above-described problems. The purpose of the invention is to provide a server, a terminal apparatus and an image management method that make a confidentiality of a document data clearer and absolutely protect the confidential document from being released to an inappropriate party.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 4 illustrates an example of a structure in which document data are stored in the server;

FIG. 5 illustrates an example of information stored in a document information table of the server;

FIG. 6 illustrates an example of information stored in a user management information table of the server;

FIG. 7 illustrates an example of information stored in a document management information table of the server;

FIG. 8 illustrates an example of information stored in an access right information table of the server;

FIG. 11 illustrates an example of a log file stored in a memory of the server;

FIG. 16 illustrates a sample of a document data with a water-mark printed out; and FIG. 17 illustrates a sample of an original document.

DETAILED DESCRIPTION OF PREFERRED EMBODIMENTS

The embodiment of the present invention is explained in the following, in reference to the above-described drawings.

Figure 1:
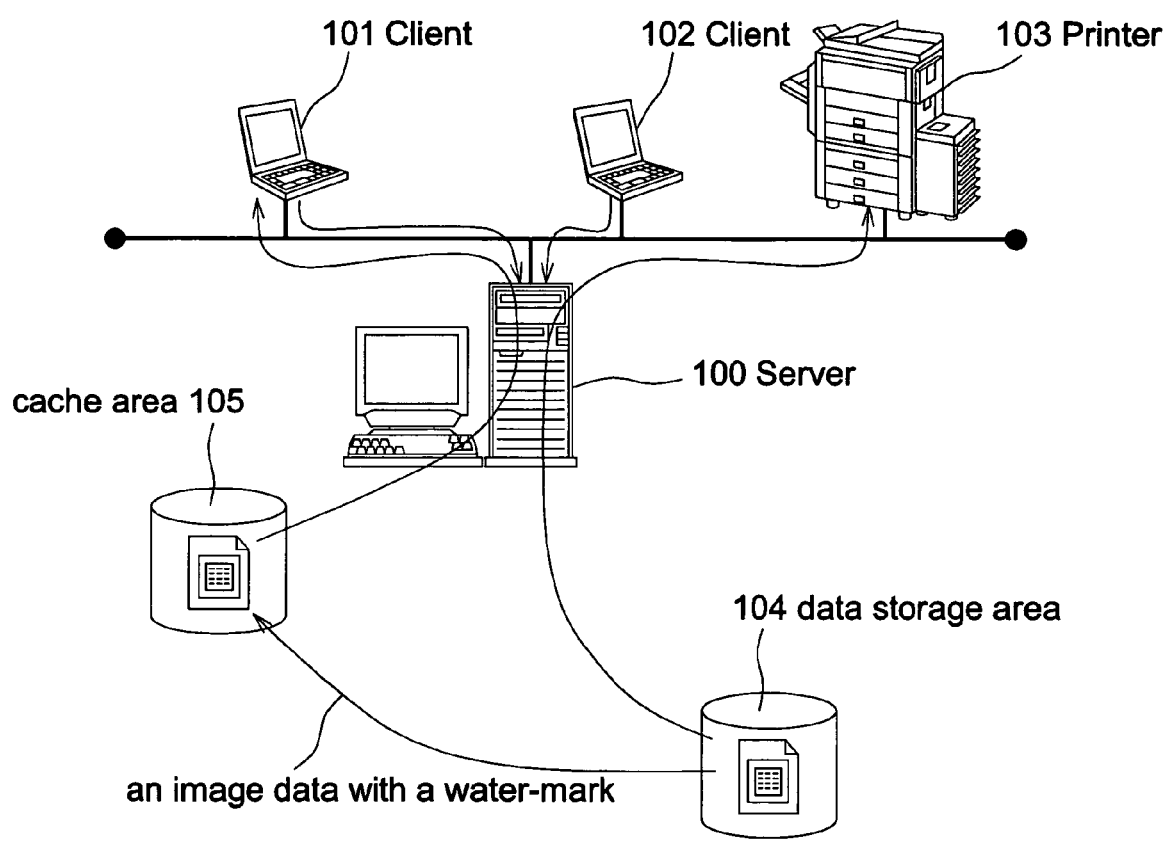
FIG. 1 illustrates a configuration of a network that connects a server with a plurality of terminal apparatuses.

FIG. 1 illustrates a configuration of a network to which a server for managing document data belongs. In FIG. 1, directions of document data flow are designated with arrows. The network of the present invention can be wired or wireless.

In FIG. 1, a client 101 and a client 102 are connected with the server 100. The client 101 and the client 102 can access the server 100. A printer 103 is connected with the server 100. The server 100 operates as a printer server. An access right is assigned to each client. In the following descriptions, the client 101 is allowed to only read document data in the server 100. The client 102 is allowed to both read document data in the server 100 and to print document data from the server 100. Although two clients are shown and discussed, any number or type of clients, printers, and servers can be provided on the network.

The server 100 stores document data which is generated by clients, in a data storage area 104 of a memory. When the server 100 receives, from the client 101, a request that the client 101 wishes to obtain document data from the server 100, as the client 101 is allowed to only read document data, the server 100 transfers original data of document data stored in the server into image data, adds a water-mark to the image data, and transmits the image data with the water-mark to the client 101. Thus, the client 101 can see the image data with the water-mark. The water-mark is stored in the data storage area 104 of the server 100.

When image data with the water-mark are first formed, they are stored in a cache area 105 of the server 100 up to a certain amount. Storing image data with a water-mark helps to reduce the time for generating the image data with the water-mark.

When the server 100 receives, from the client 102, a request for printing an original data from the server 100, as the client 102 is allowed to both read the original data and to print the original data, the server 100 transfers, to the printer 103, the original data stored in the server without adding a water-mark. Thus, the printer 103 prints out the original data.

Figure 2:
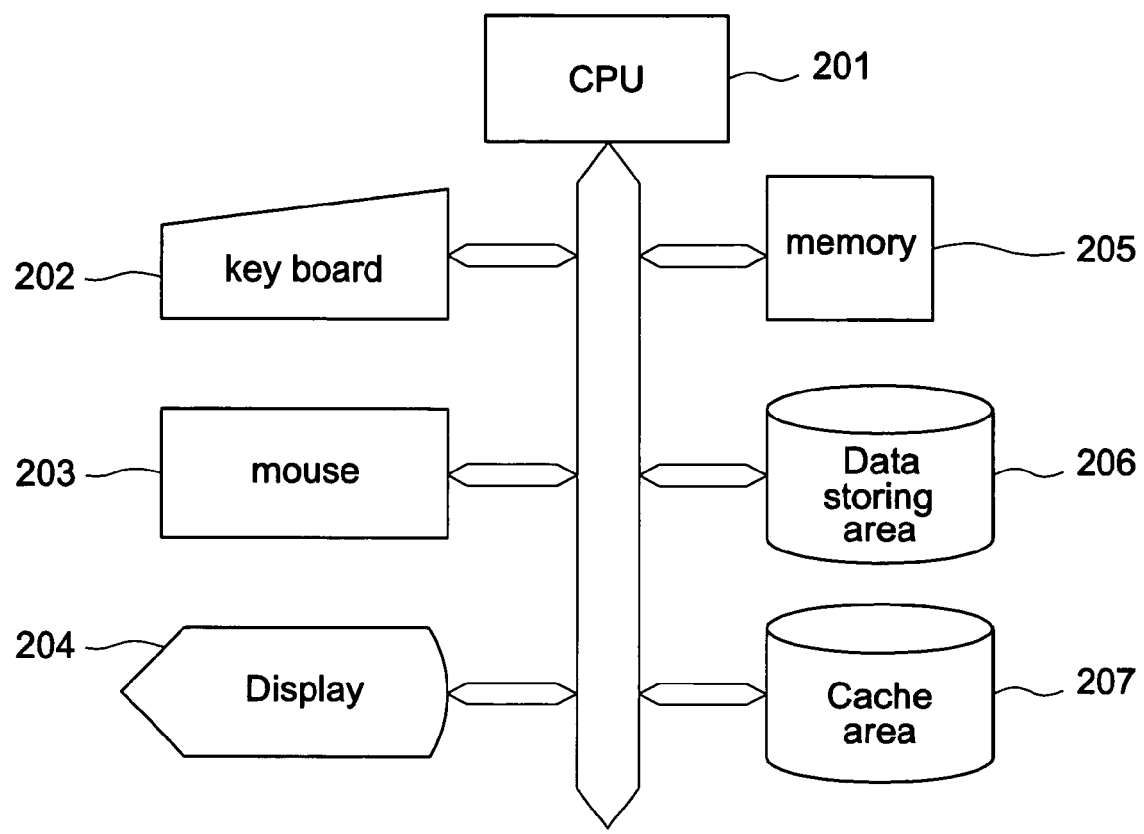
FIG. 2 illustrates, in block diagram fashion, a configuration of the server.

FIG. 2 is a block diagram showing a configuration of the server 100.

The server 100 has a CPU 201 that controls the entire server 100. The CPU 201 is connected with a keyboard 202, a mouse 203 and a display section 204 through buses. Other input and output devices can of course be provided. Further, any type of keyboard, mouse, and display can be used in the present invention.

The CPU 201 is connected with a memory 205, a hard-disk 206 that has a data storage area 104 in which the above described original data are stored, and a hard-disk 207 that has a cache area 105 in which the above described image data with the water-mark are stored up to a certain amount, i.e. up to the capacity of the cache area 105. Of course, any type of data storage mechanism can be utilized herein.

Memory 205 stores programs which are utilized for controlling the server 100 by the CPU 201. Memory 205 also provides a work area where the programs are executed. Memory 205 stores tables which are utilized for managing the original data stored in the data storage area 104 of the hard-disk 206. Particularly, memory 205 stores a document information table 300, a user management table 400, a document management table 500, and an access right information table 600.

Figure 3:
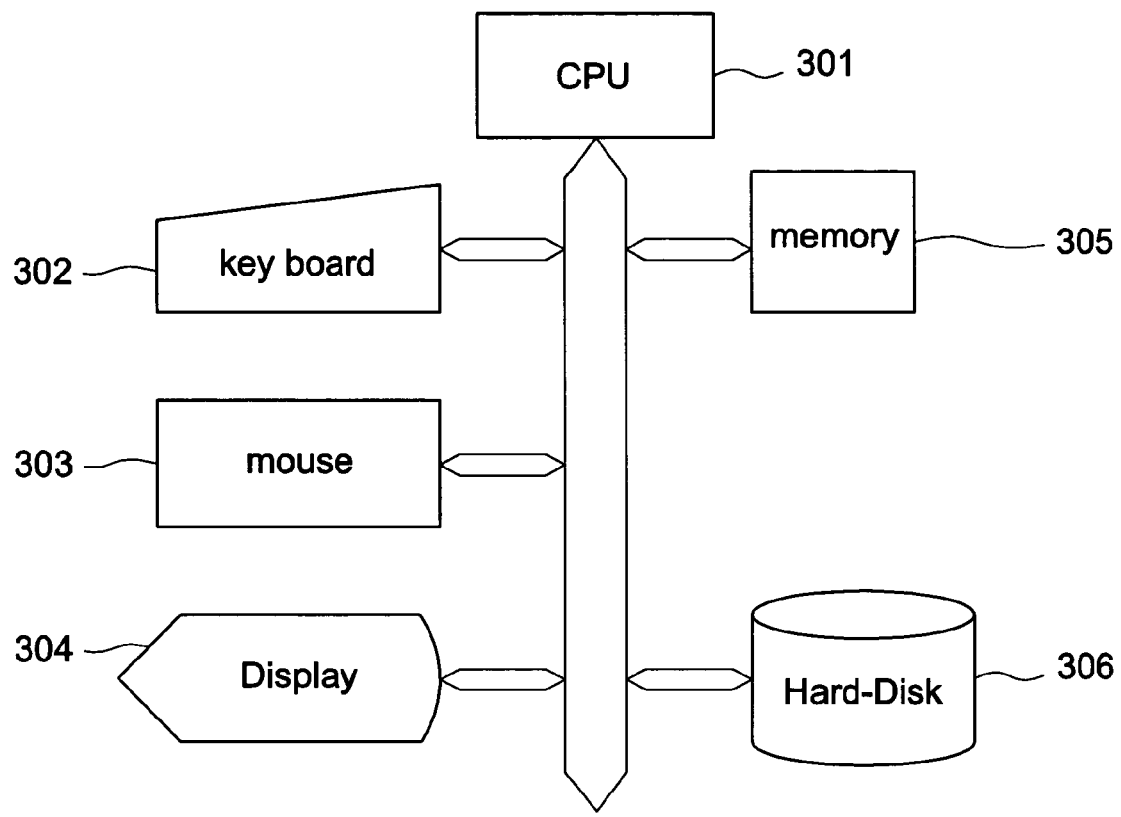
FIG. 3 illustrates, in block diagram fashion, a configuration of a terminal apparatus connected with the server.

FIG. 3 is a block diagram showing a configuration of a terminal apparatus connected with the server 100. Here, only the client 101 is explained, since the client 102 has a similar configuration to the client 101. However, it is within the scope of the present application to utilize client terminals of any configuration, whether similar to each other or not.

The client 101 has a CPU 301 that controls the entire client 101. The CPU 301 is connected with a keyboard 302, a mouse 303, and a display section 304 through buses. Of course, any type of input and output devices can be utilized herein. Also any type of keyboard, mouse, or display can be utilized.

The CPU 301 is connected with a memory 305 which stores programs and is utilized for a work area of the programs, and with a hard-disk (HD) 306 or other storage medium which stores data made by the client 101.

Next, the relations between the original data stored in the data area of the hard-disk 206 and the information stored in the tables of the memory 205, are explained. FIG. 4 shows examples of the original data stored in the data area of the hard-disk 206.

As illustrated FIG. 4, the data area stores an original data 401 assigned "D00000001" as a document ID and stores original data 402 assigned "D00000002" as a document ID. The original data assigned "D00000001" and "D00000002" are stored in a folder 403 assigned "F00000002" as a folder ID. A folder 405 assigned "F 00000001" as a folder ID stores the folder 402 and original data 404 assigned "D 00000003" as a document ID. The information stored in the tables of the memory 205 are explained as follows, under the assumption that above explained original data are stored in the data area of the hard-disk 206.

FIG. 5 is an example of information stored in a document information table 300. As shown in FIG. 5, the document information table 300 stores user IDs 502 which show predetermined users who are given an image data with a water-mark, attributes of water-marks 503, file names of water-marks 504 (in the following descriptions, they are identified only as "file names"), locations 505 which indicate where a water-mark is added in an image data, and pages 506 which indicate at which page of a document a water-mark is added. Each of these items of information are stored associated with document IDs 501.

In the column of document IDs 501, not only a document ID but also a folder ID can be stored. An ID whose the first letter is "D", is a document ID and an ID whose the first letter is "F", is a folder ID. A column of folder IDs can be separated from the column of document IDs 501.

When "everyone" is stored in the column of user IDs 502, a predetermined user is not specified. This means that an image data with a water-mark is given to a plurality of users including a predetermined user and at least one other user. In the column of the attributes 503, "data file" is stored, when an image data is utilized as a water-mark. The image data is stored in a data file with a file name stored in the column of file names 504. In the column of the attributes 503, "user name" is stored, when a user name is utilized as a water-mark. The user name is a name of a user who reads a document data.

In the column of file names 504, a file of "Top-secret. tif" is utilized, when the term "Top-secret" is added as a water-mark. "Top-secret. tif" is a file that stores an image data of a water-mark showing the term "Top-secret". A file of "Confidential. tif" is utilized, when the term "Confidential" is added as a water-mark. mark. "Confidential. tif" is a file that stores image data of a water-mark showing the term "Confidential". In the column of positions 505, a position on a paper where a water-mark is added, e.g. "top left" and a point-numbers from a corner of the paper, e.g."30:30", are stored. In the column of pages 506, information of "Top" is stored, when a water-mark is added at only the front page. Information of "ALL" is stored, when a water-mark is added at all pages.

User IDs 502 of the document information table 300 are managed by the user management information table 400. FIG. 6 shows examples of information stored in the user management information table 400. As shown in FIG. 6, user IDs 102 are stored associated with names 601 of users to whom user IDs 102 are assigned.

Document IDs 501 of the document information table 300 are managed by the document management information table 500. FIG. 7 shows examples of information stored in the document management information table 500. As shown in FIG. 7, document IDs 501 are associated with edition numbers 701, folder IDs 702, dates 703, makers 704, and document names 705. The edition numbers 701 shows how many times an original data is revised. The folder IDs 702 shows information regarding folders to which the original data belongs. The dates 703 shows when the original data was made. The makers 704 of the original data shows who made the original data. Document names 705 shows the names of the original data.

Access rights to Document IDs 501 of the document information table 300 are managed by the access right information table 600. FIG. 8 shows examples of information stored in the access right information table 600. As shown in FIG. 8, document IDs 501 are associated with user IDs 502 which shows information regarding a user who can access original data and is associated with access rights 801 which are given to a particular user for accessing the original data. For example, the document ID "D00000001" is stored associated with "everyone" in the column of user IDs 502 and "full access" in the column of access rights 801. This means that "everyone" can both read and delete the original data associated with the document ID "D00000001". The document ID "D00000003" is stored associated with "Ohtsuka" in the column of user IDs 502 and "read" in the column of access rights 801. This means that only Mr. Ohtsuka can only read the original data associated with the document ID "D00000003".

Figure 9:
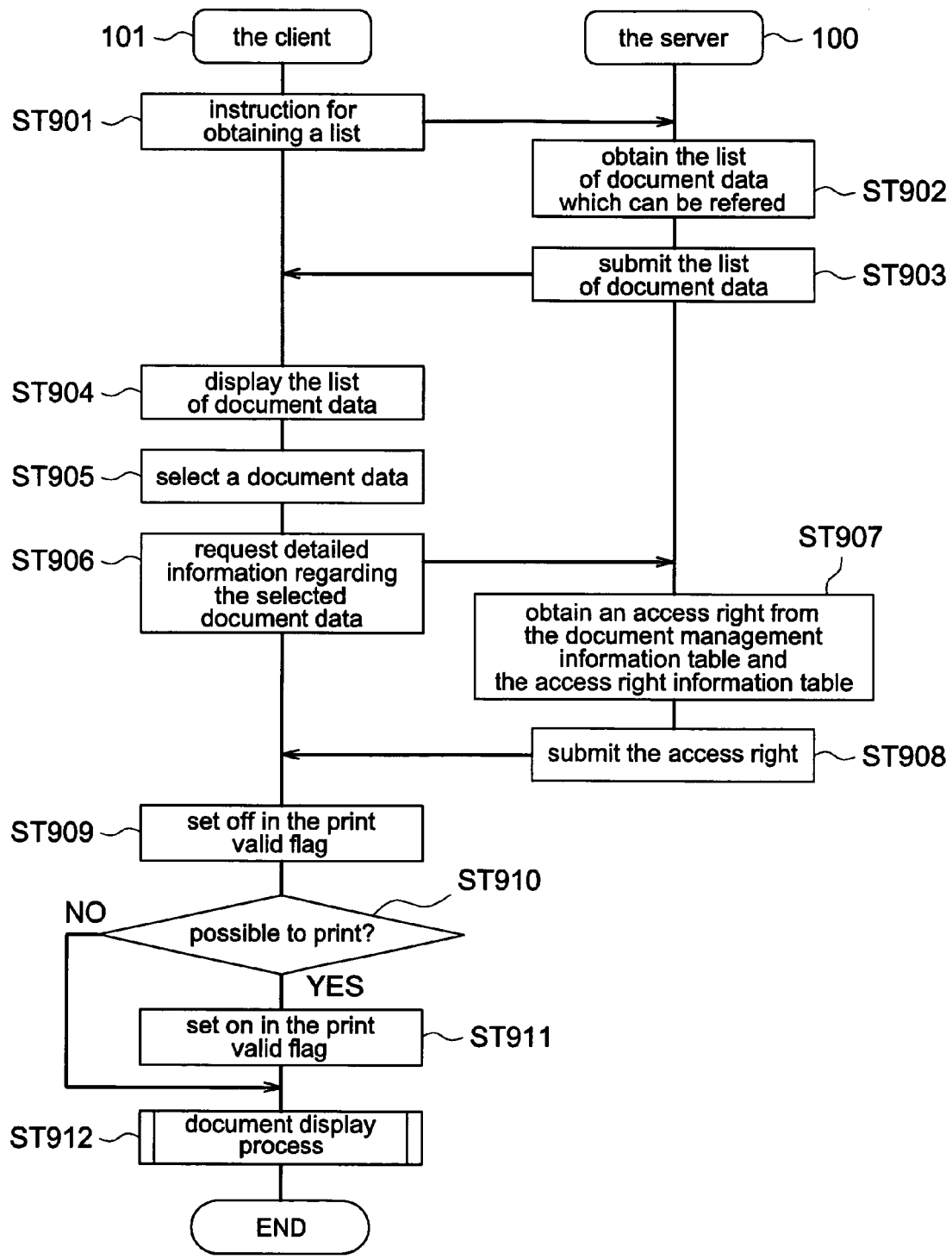
FIG. 9 illustrates a flow chart describing an operation performed between the server and the terminal apparatus when a client reads a document data stored in the server.

The server 100 and the client 101 (102) are configured as described above. An interaction between the server 100 and the client 101 is explained as follows. First, an operation by which the client 101 reads document data stored in the server 100, is explained. FIG. 9 is a flow chart describing an operation performed between the server 100 and the client 101 as a terminal apparatus, when the client 101 reads document data stored in the server 100.

The client 101 needs to input an user ID, when the client 101 logs onto the network which is managed by the server 100. The server 100 recognizes user IDs of users who utilize the client 101.

When the client 101 displays a document data in the server 100 on the display section 304, the client 101 instructs the server 100 to transmit a list of document data which the client 101 can display (ST 901). The server 100 obtains the list of document data which the client 101 can display (ST 902) and transmits the list to the client 101 (ST 903).

The client 101 displays the list on the display section 304 (ST 904), and selects a document data based on an input from keyboard 302 or other input device (ST 905). The client 101 requests the server 100 to transmit detailed information regarding the selected document data (ST 906). This request includes the document ID 501.

The server 100 obtains an access right that the user has, based on the document data, from the document management information table 500 and the access right information table 600, based on the document ID 501 and the user ID 502 (ST 907). The document ID 501 is included in the request and the user ID 502 has been already recognized by the server 100. The server transmits the access right to the client 101 (ST 908).

When the client 101 receives the access right, the client sets OFF as a default in a print valid flag of the memory (ST 909). The print valid flag shows whether it is possible or not to print the document data. After setting OFF in a print valid flag, the client 101 judges, based on the access right, whether it is possible or not to print the document data (ST910). In the other words, the client 101 judges whether the access right includes printing or not. When the client 101 judges that it is possible to print the document data, the client 101 sets ON in a print valid flag (ST 911). After that, the client 101 advances to a document display process of ST 912. When the client 101 judges that it is not possible to print the document data, the client 101 advances to a document display process of ST 912, because OFF has been set in a print valid flag (ST 909).

Figure 10:
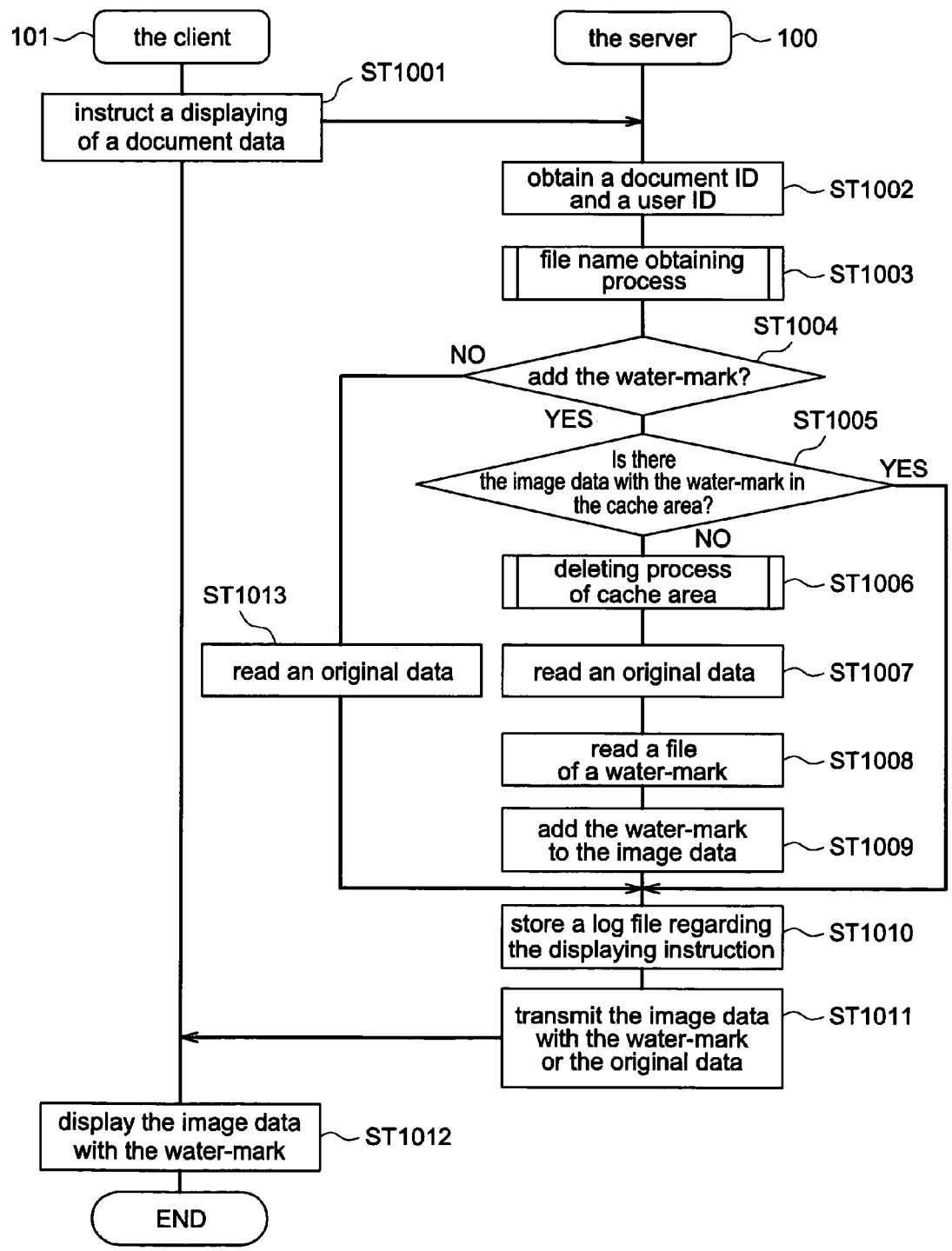
FIG. 10 illustrates a flow chart describing an operation performed in ST 912 of FIG. 9.

The document display process is explained by FIG. 10. FIG. 10 is a flow chart describing the document display process performed in ST 912 of FIG. 9.

Client 101 instructs a displaying of document data (ST 1001). This instruction includes a document ID. When the server 100 receives the instruction, the server 100 obtains the document ID and the user ID (ST 1002). The server then proceedes to a file name obtaining process (ST 1003). In the file name obtaining process, the server obtains a file name, based on the document ID and the user ID. The file name obtaining process will be explained later.

After the file name obtaining process, the server 100 judges whether the server should add a water-mark to an image data (ST 1004). Original data of document data is transformed into image data. When the server 100 judges that the server should add the water-mark to the image data, the server 100 judges whether the image data with the water-mark has been stored in a cache area 105 of the memory (ST 1005). When the server 100 judges that the image data with the water-mark has been stored in a cache area 105 of the memory, the server 100 advances to ST 1010. The server 100 can transmit the image data with the water-mark from the cache area 105 to the client 101. When the server 100 judges that the image data with the water-mark has not been stored in a cache area 105 of the memory, the server executes a process for adding the water-mark to the image data. Before the process, the server confirms the capacity of the cache area 105. When the cache area 105 does not have enough space to save a new data, the server 100 deletes the image data with the water-mark which are stored in the cache area 105 (ST 1006). This process is called a deleting process of the cache area 105. The deleting process of the cache area 105 will be explained later.

After the deleting process of the cache area 105, the server 100 reads the original data associated with the document ID from the data area of the memory (ST 1007). The server 100 reads a file of a water-mark from the data area of the memory (ST 1008). The server 100 processes the original data and the water-mark (ST 1009). Particularly, the server 100 transforms the original data into image data in the form of tiff data and adds the water-mark to the image data. The server 100 stored the image data with the water-mark.

When the corresponding file name 504 of the document information table 300 does not store a water-mark, but the corresponding attribute 503 of the document information table 300 stores a user name, the server 100 uses the user name as the water-mark. This process will be explained later.

The server 100 makes a log file regarding the displaying instruction from the client 101 (ST 1010). The log file is stored in a predetermined area of the memory 205. As shown in FIG. 11, the log file includes a process time 1101, the user ID 502, a host 1102, a process content 1103, the document ID 501, an edition 701, pages 1104, and a number of copies 1105. After the log file is stored, the server 100 transmits the image data with the water-mark to the client 101 (ST 1011). The client displays the image data with the water-mark on the display 304 section (ST 1012). The document display process then ends.

As above explained, the server 100 does not transmit original data, but the image data with the water-mark to the client 101. Thus, it will be clearer for the client 101 that the original data is confidential. As the original data is transformed into the image data, the client 101 can not edit the original data. Thus, the invention protects the original data from being leaked and from being modified.

As above explained, the server 100 judges whether the image data with the water-mark is stored in the cache area 105 or not. When the image data with the water-mark is stored in the cache area 105, the server 100 submits the image data with the water-mark from the cache area 105 to the client 101. Thus, when the image data with the water-mark is stored in the cache area 105, the server does not need to create the image data with the water-mark. Accordingly, the server 100 can quickly response to the client 101.

When a water-mark is not stored in the column of the file name 504 of the document information table 300, but a user name is stored in the column of the attribute 503 of the document information table 300, the server adds the user name as the water-mark to the image data. Thus, as this embodiment makes it clear who accessed the original data, it protects the original data from being leaked much more effectively.

In ST 1004, when a water-mark is not to be added, the server 100 reads the original data associated with the document ID (ST 1013). After the log file is stored (ST 1010), the server transmits the original data to the client 101 (ST 1011).

Figure 12:
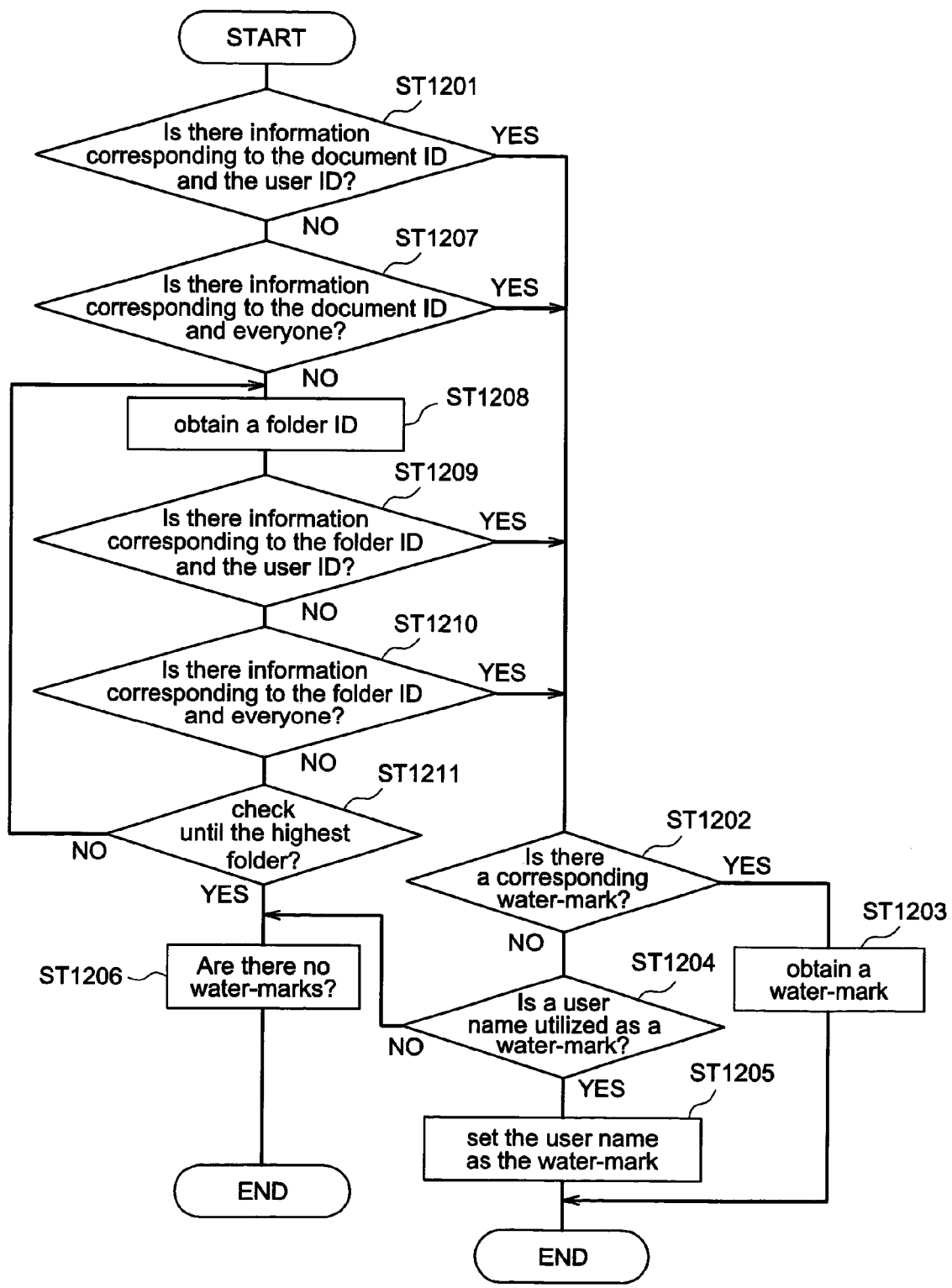
FIG. 12 illustrates a flow chart describing an operation for selecting a water-mark in the server.

Next, the file name obtaining process at ST 1003 of the FIG. 10 is explained. FIG. 12 is a flow chart for explaining the file name obtaining process.

In the file name obtaining process, the server 100 judges whether the server 100 has information associated with the document ID and the user ID in the document information table 300 (ST 1201). When the information exists in the document information table 300, the server 100 judges whether a corresponding water-mark is stored in the column of the file name 504 (ST 1202). When the water-mark exists in the column of the file name 504, the server 100 obtains the water-mark from the column of the file name 504 (ST 1203).

As above explained, the water-mark is selected based on the document ID and the user ID. Thus, when a combination of the document ID and the user ID is altered, a water-mark is changed. For example, when Mr. A obtains the document data 1, "confidential" may be selected as the water-mark. When Mr. B obtains the document data 1, "top-secret/not permitted to print" may be selected as the water-mark. When Mr. A obtains the document data 2, "not permitted to deliver/not permitted to print" may be selected as the water-mark. When Mr. B obtains the document data 2, "confidential" may be selected as the water-mark. Therefore, levels of secrets can be carefully set based on an authority of a person and importance of a document data.

When the water-mark associated with the document ID and the user ID does not exist in the column of the file name 504, the server 100 judges whether a user name is stored in the column of the attribute 503 of the document information table 300 (ST 1204). Thereby, the server 100 judges whether the user name is set as a water-mark. When the user name is set as the water-mark, the server adds the name of the client 101 who accesses the server 100, as the water-mark to the original data (ST 1205). In the other words, the server 100 obtains the user name associated with the user ID from the user management information table 400 shown in FIG. 6. The server transforms the user name into an image data and adds the user name as the water-mark to the image data of the original data. Another word such as e.g. a term "reference" may be added to the user name. For example, "Mr. Ohtsuka refers to this document" may be used as the water-mark. The user name as the water-mark is stored in a predetermined area of the memory 205.

In ST 1204, when the user name is not set as the water-mark, the server 100 determines not to add a water-mark to the image data (ST1206).

In ST 1201, when information associated with the document ID and the user ID is not stored in the document information table 300, the server 100 searches for information that corresponds to the document ID and that "everyone" is set as a user name (ST 1207). When the server 100 finds the information, the server 100 performs the above noted ST 1202~ST1206.

In ST 1207, when the document information table 300 does not store the information that corresponds to the document ID and that "everyone" is set as a user name, the server 100 obtains a folder ID of a folder which includes the document associated with the document ID (ST 1208). The server 100 obtains the folder ID associated with the document ID from the document management information table 500. The server 100 judges whether the document information table 300 stores information associated with the folder ID and the user ID. When the information is stored, the server 100 processes the above ST 1202~ST1206.

In ST 1209, when the document information table 300 does not store the information associated with the folder ID and the user ID, the server 100 judges whether the document information table 300 stores information that corresponds to the folder ID and that "everyone" is set in the column of the user name 502 (ST 1210). When the document information table 300 stores the corresponding information, the server 100 processes the above ST 1202~ST1206.

As above explained, the server 100 can change a type of a water-mark based on a combination of an user ID and a folder ID which includes the document associated with the document ID. For example, when Mr. A obtains the document 1 in the folder 1, the server 100 can add the water-mark "confidential" to the document 1. When Mr. B obtains the same document 1 in the folder 1, the server 100 can add the water-mark "not permitted to print" to the document 1. Thereby, the server 100 can individually set a water-mark based on a folder that includes the document and an authority of a person who obtains the document.

In ST 1210, when the document information table 300 does not store the information that corresponds to the folder ID and that "everyone" is set in the column of the user name 502, the server 100 judges whether the server 100 has checked the highest folder. When the server 100 has not checked the highest folder, the server 100 returns to ST 1208. When the server 100 has checked the highest folder, the server 100 judges there is no water-mark associated with the document. The process then ends. Whether the server 100 has checked the highest folder can be determined as follows. For example, the server 100 has a table showing a relationship between the folder 403 and the folder 405 in FIG. 4. The sever 100 first checks the folder 403 and than checks the folder 405. In this case, the folder 405 is the highest level folder. After the server 100 has checked the folder 405, the process ends.

FIG. 12 selects a water-mark based on a combination of a document ID and a user ID, or based on a combination of a folder ID and a user ID, but the invention is not limited to such an embodiment. For example, a water-mark can be selected based on only a document ID or based on only a folder ID. A water-mark can be also selected based on a combination of a document ID, a user ID, and a folder ID, as well as other appropriate ID parameter and/or combinations thereof.

When a water-mark is selected based on only a user ID, the water-mark can be changed based on the user ID. For example, when Mr. A is a manager, "confidential" can be selected as the water-mark. When Mr. B is an employee, "confidential, not permitted to deliver" can be selected as the water-mark. When Mr. C is a part-timer, "confidential, not permitted to deliver, not permitted to print" can be selected as the water-mark. Since a water-mark is selected based on a user as in the above examples, the levels of security of a document can be individually set based on each user.

When a water-mark is selected based only on a folder ID, the water-mark can be changed based on a folder that stores a document that a user accesses. For example, when the document is stored in a folder of company bulletins, "confidential" is selected as the water-mark. When the document is stored in a folder of approvals by the director, "not permitted to be out of the section" is selected as the water-mark. When the document is stored in a folder of customer information, "top-secret, not permitted to delivery, not permitted to print" is selected as the water-mark. Since a water-mark is selected based on a folder as in the above examples, the water-mark does not need to be set for each document individually. Therefore, it becomes simple to set a water-mark for each document.

When a water-mark is selected based on a combination of a document ID, a user ID and a folder ID, the water-mark can be changed based on the combination. For example, "top-secret" is set as a common water-mark for the folder 1. When Mr. A obtains the document 1 in the folder 1, "top-secret, not permitted to be out of the section" is selected as the water-mark. When Mr. B obtains the same document 1 in the folder 1, "top-secret, not permitted to print" is selected as the water-mark. When Mr. A obtains the document 2 in the folder 1, "not permitted to deliver, not permitted to print" is selected as the water-mark. When Mr. B obtains the same document 2 in the folder 1, "confidential" is selected as the water-mark. When another person obtains the document 1 or the document 2 in the folder 1, "top-secret" is selected as the water-mark, as "top-secret" is set as the common water-mark for the folder 1. In this case, a water-mark is selected based on who obtains which document. Therefore, the levels of security of a document can be set in detail i.e. individualized. It is also useful for a non-specified person to select a common water-mark.

In the document information table 300, two types of user IDs can be set to be associated with the same document ID. One of the two indicates a plurality of users including a predetermined user and at least one other user, e.g. "everyone". Another indicates a predetermined user, e.g. "Mr. A". Each user ID has its own water-mark. In this case, either of the water-marks can be given priorities, i.e. made the default water-mark. This embodiment is explained by FIG. 5.

Regarding the document ID "D00000003" in the document information table 300 of FIG. 5, there are three items of information in the column of user ID associated with the document ID "D00000003". They are "Everyone", "Minakawa", and "Yoshida". In the column of file name associated with the document ID "D00000003", "Top-secret. tif" is set associated with "Everyone" and "Confidential. tif" is set associated with "Miyakawa" and "Yoshida". Water-Marks of "Miyakawa" and "Yoshida" are given priority over the water-mark of "Everyone", because the water-marks of "Miyakawa" and "Yoshida" are used for predetermined users.

As above explained, both a common water-mark and a predetermined water-mark can be stored for a predetermined user. The common water-mark is used for all users. When "Everyone" is stored in the column of user ID, a water-mark associated with "Everyone" becomes the common water-mark. Thus, it becomes easy to store the common water-mark, as the common water-mark need not be stored for each user. On the other hand, when the predetermined user wants to add a predetermined water-mark, the predetermined water-mark should be individually stored. The predetermined water-mark is given priority over the common water-mark. Thus, after the common water-mark has been stored, the predetermined water-mark can be newly stored. The predetermined user does not need to delete the common water-mark, when the predetermined user newly stores the predetermined water-mark. Therefore, it is not complicated to add another water-mark for a predetermined user and to change water-marks.

In this embodiment, a priority is given between a user ID "Everyone" which indicates a plurality of users including a predetermined user and at least one other user, and a user ID which indicates a predetermined user. However, the present invention is not limited to this embodiment. A priority can be given between a folder ID which indicates a predetermined folder and a user ID which indicates a predetermined user.

In this case, both a common water-mark and a predetermined water-mark can be stored for a predetermined user. The common water-mark is used for all documents of the predetermined folder. The common water-mark for all documents of the predetermined folder need not be stored for each user. Thus, it becomes easy to store the common water-mark for all documents of the predetermined folder. On the other hand, when the predetermined user wants to add the predetermined water-mark, the predetermined water-mark should be individually stored. The predetermined water-mark has priority with respect to the common water-mark. Thus, after the common water-mark for all documents of the predetermined folder has been stored, the predetermined water-mark can be newly stored. The predetermined user does not need to delete the common water-mark, when the predetermined user newly stores the predetermined water-mark. Therefore, adding another water-mark for a predetermined user and changeing water-marks is not complicated.

Figure 13:
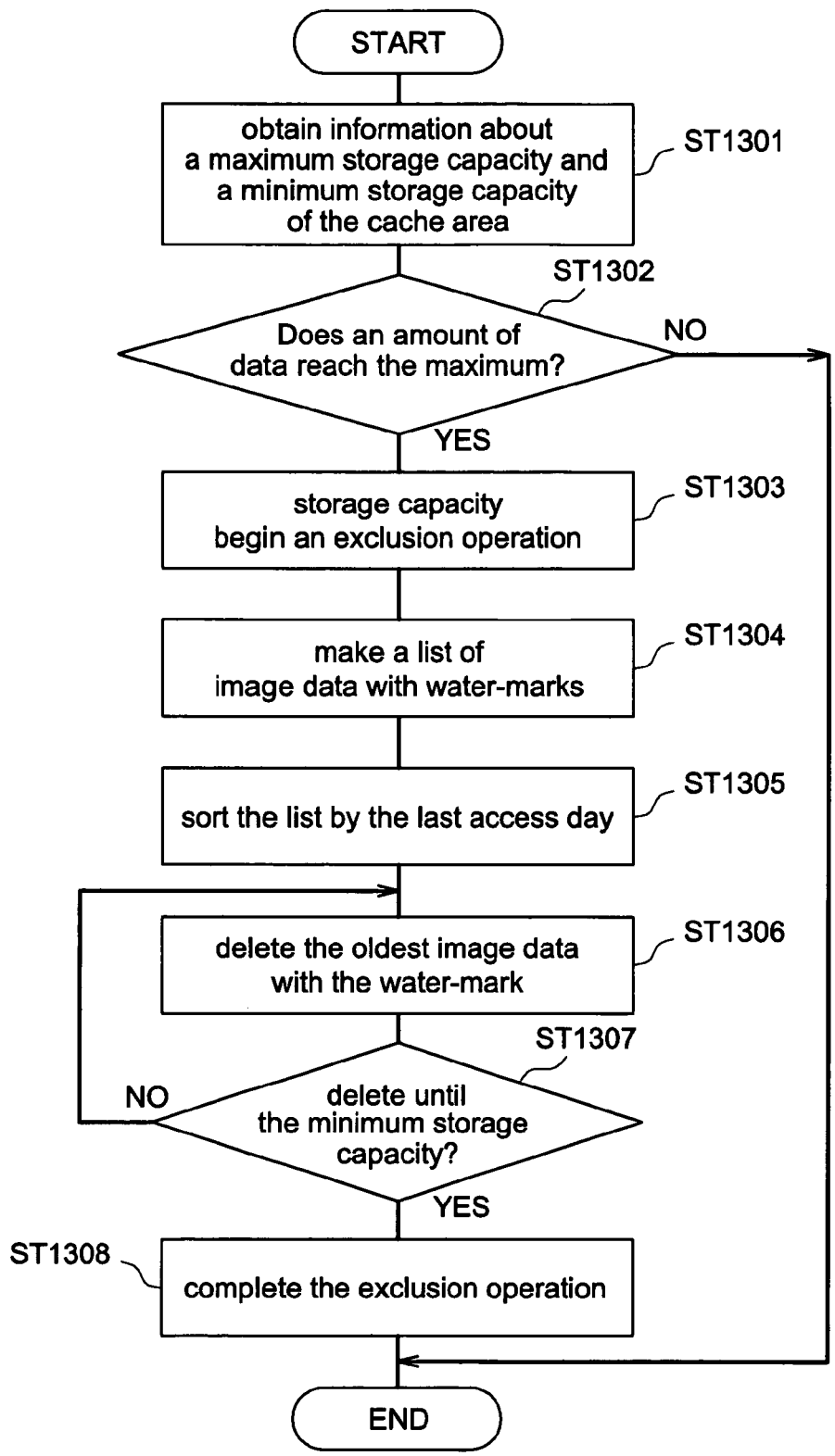
FIG. 13 illustrates a flow chart describing an operation for deleting a cache area in the server.

Next, an operation for deleting a cache area 105 is explained. FIG. 13 is a flow chart describing the operation of deleting the cache area 105 in the server, at ST 1006 of FIG. 10.

In the operation of deleting the cache area 105, the server 100 obtains information about a maximum storage capacity and a minimum storage capacity of the cache area 105 (ST1301). The information about a maximum storage capacity and a minimum storage capacity of the cache area 105 are stored in a predetermined area of the memory 205. The server 100 can obtain such information by reading the predetermined area of the memory 205.

The server 100 judges whether an amount of data stored in the cache area 105 has reached the maximum storage capacity of the cache area 105 (ST 1302). When a amount of data has not reached the maximum storage capacity, the operation ends. When an amount of data has reached the maximum storage capacity, the server 100 begins an exclusion operation (ST 1303). The exclusion operation is an operation that prevents other clients from accessing an image data with a water-mark in the cache area 105.

In the exclusion operation, the server 100 makes a list of image data with water-marks stored in the cache area 105 (ST 1304). The server 100 sorts the list by the last date when clients accessed the image data with the water-mark (ST 1305). The server 100 then deletes the oldest image data with the water-mark (ST 1306). After that, the server 100 checks whether a amount of data stored in the cache area 105 reaches the minimum desirable storage capacity of the cache area 105 (ST 1307). Finally, the server 100 completes the exclusion operation (ST 1308). The operation for deleting the cache area then 105 ends.

Figure 14:
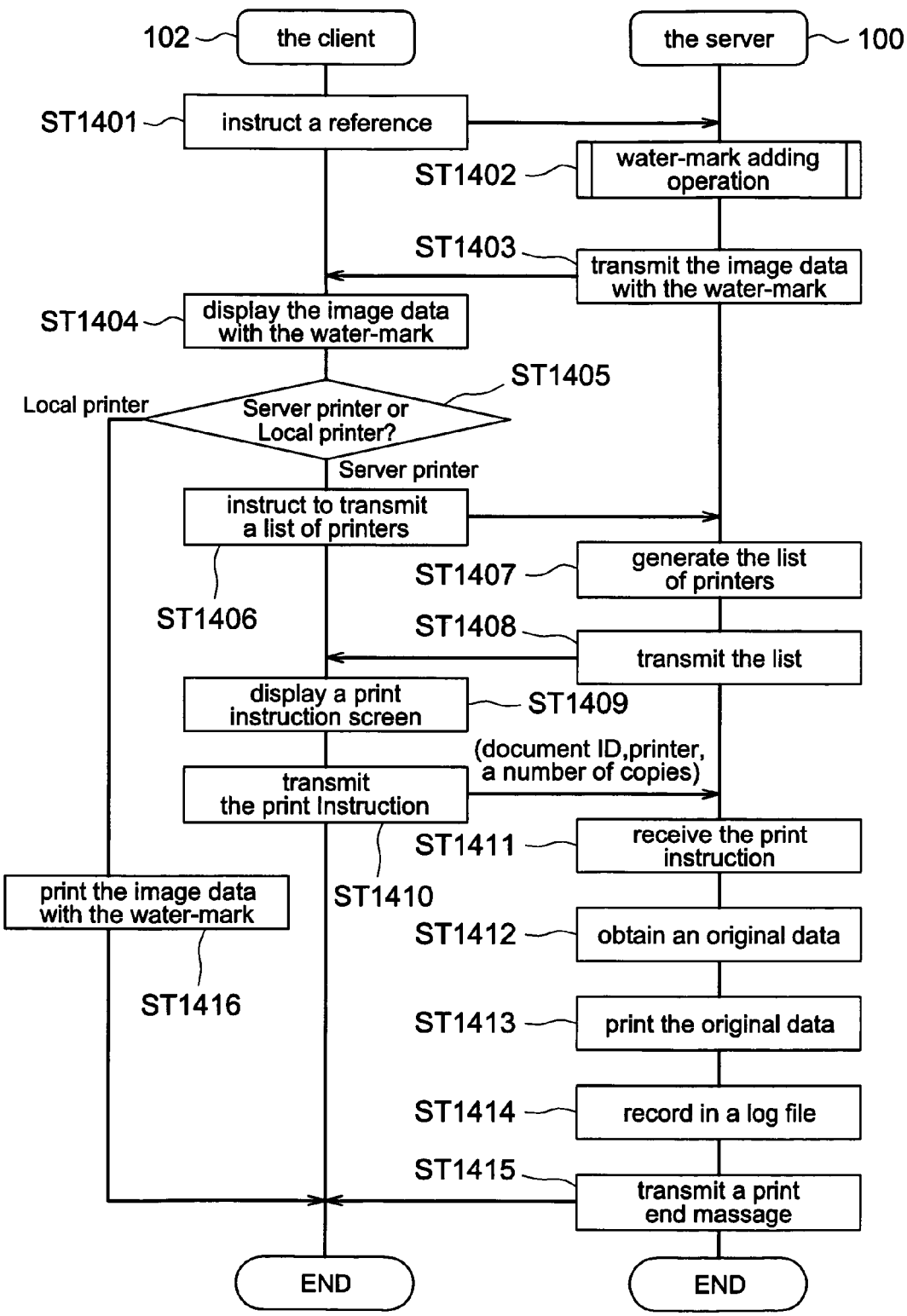
FIG. 14 illustrates a flow chart describing an operation performed between the server and the terminal apparatus when the terminal apparatus sends a print instruction to the server.

Next, an operation for printing document data will be explained. FIG. 14 is a flow chart describing an operation performed between the server 100 and the client 102 when the client 102 transmits a print instruction to the server 100.

The client 102 instructs the server 100 to print document data, after the client 102 has performed the above described operation for reading document data. In other words, the client 102 instructs the server 100 to print document data, after the client 102 has performed the same operations shown in FIG. 9~FIG. 13. In FIG. 14, a water-mark has already been added to an image data that client 102 displays.

When the client 102 instructs the server 100 to refer to a document data (ST 1401), the server 100 performs the water-mark adding operation based on the instruction (ST 1402). The water-mark adding operation is shown in ST 1002~ST 1008 of FIG. 10. This instruction (ST 1401) includes a document ID. After ST 1402, the server 100 transmits the image data with the water-mark to the client 102 (ST 1403). The client 102 displays the image data with the water-mark on the display (ST 1404).

Figure 15A:
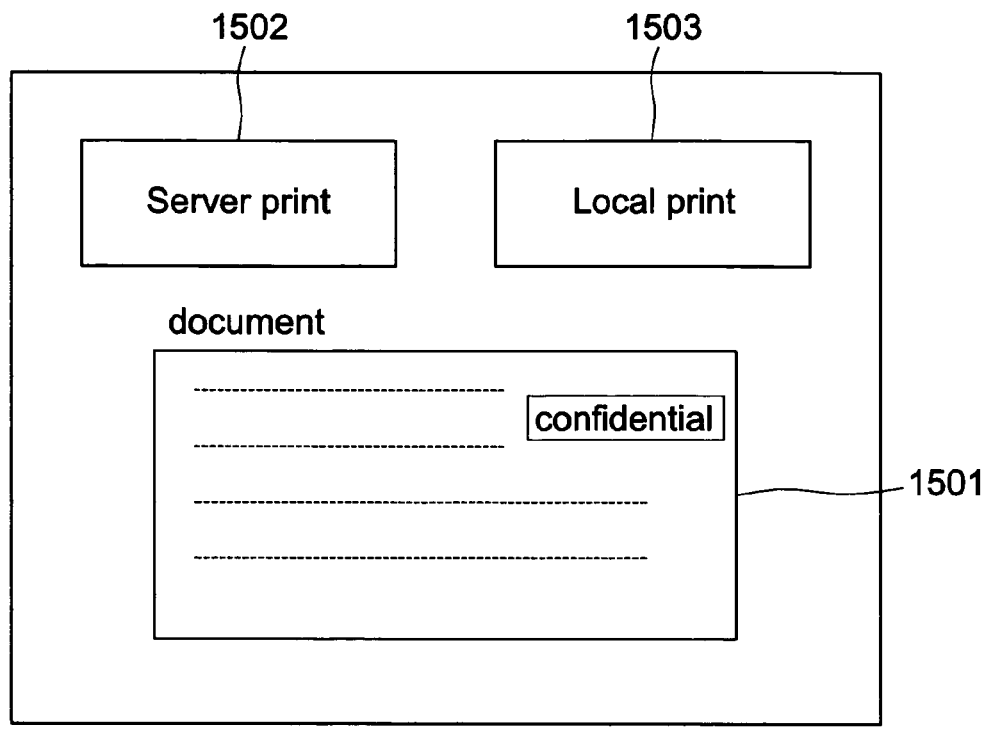
FIGS. 15a and 15b illustrate two samples of document data with a water-mark displayed at the terminal apparatus.
Figure 15B:
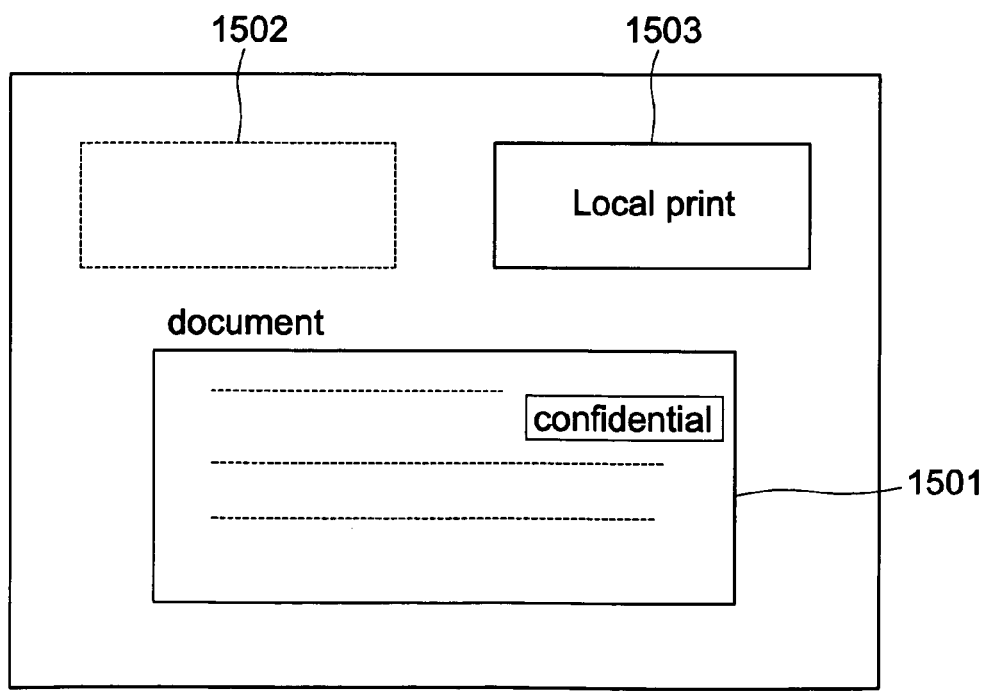

Here, a display 304 (FIG. 3) of the client 102 will be explained. The display 304 displays the image data with the water-mark. FIG. 15 are two samples of an image data with a water-mark displayed at the display of the client 102.

As shown in FIG. 15, a document area 1501, a server print instruction button 1502 and a local print instruction button 1503 are displayed on the screen of the display 304. The document area 1501 displays an image data with a water-mark. The server print instruction button 1502 designates a printer which is connected with the client 102 via network, e.g. the printer 103 to print out the document data via the server 100. The local print instruction button 1503 designates a printer which is connected locally with the client 102 to print out the document data.

The server print instruction button 1502 changes based on the status of the print valid flag set in the memory 205, during the reference process shown at ST 909~ST 911 of FIG. 9. ON or OFF is set at the print valid flag based on whether the client 102 has an access right to print the designated document data or not. When the client 102 has the access right to print the designated document data, ON is set at the print valid flag. When the client 102 does not have the access right to print the designated document data, OFF is set at the print valid flag. When the print valid flag is ON, the server print instruction button 1502 appears on the display section 304, as shown in FIG. 15 (*a*). When the print valid flag is OFF, the server print instruction button 1502 disappears on the display section 304, as shown in FIG. 15 (*b*).

In ST 1405, the client 102 judges whether the server printer or the local printer is selected, based on whether the server print instruction button 1502 or the local print instruction button 1503 is selected.

When the server print instruction button 1502 is selected, the client 102 instructs the server 100 to transmit a list of printers connected with the network (ST 1406). The server 100 generates the list regarding printers that can print out, based on the instruction (ST 1407), and transmits the list to the client 102 (ST 1408).

When the client 102 obtains the list, the client 102 displays a print instruction screen (ST 1409). A user can select a printed object and a number of prints by using the print instruction screen. The user of the client 102 inputs some information at the print instruction screen. After that, the client 102 transmits a print instruction to the server 100 (ST 1410). The print instruction includes a document ID, a selected printer, and a number of copies.

When the server 100 receives the print instruction, the server 100 obtains an original data associated with the document ID included in the print instruction, form the data storage area 104 (ST 1412). The server 100 prints out the original data from the designed printer (ST 1413). The server 100 records the print instruction of the client 102 in a log file (ST 1414). The server 100 transmits a print end message to the client 102 (ST 1415). This process ends.

As above explained, a user who has an access right can obtain an original data without a water-mark. When the user obtains the original data, the server records the log of printing the original data. Thus, the server 100 can manage the printings of confidential documents and can check unauthorized printings of confidential documents.

In ST 1405, When the local printer is selected, the client prints out an image data with a water-mark that is displayed on the display section 304, from a printer locally connected with the client 102 (ST 1416).

FIG. 16 is a sample of an image data with a water-mark printed out from a local printer. FIG. 17 is a sample of an original data printed out via the server 100. As shown above in FIG. 16 and FIG. 17, even if the same document data is printed out, whenever the document data is locally printed, the document data has always a water-mark added thereto. As this document data with the water-mark is an image data, a user of the client 102 can not edit the document data. When the document data is printed via the server 100, the document data does not have a water-mark added thereto.

As explained above, the server 100 does not transmit an original data associated with a reference instruction, but document data with a water-mark to the client 101. Thus, this embodiment can make it clear that the document data is confidential. As this document data is transformed into an image data, a user can not edit the document data. Thus, this embodiment can prevent the document data from being altered and from being released.

The above embodiment explains the case that when the client 101 or 102 requests the server 100 to obtain document data, the server 100 submits the document data with a water-mark, but the present invention is not limited to this embodiment. For example, whenever the server 100 receives the request from the client 101 or 102, the server 100 can always judge whether a user of the client 101 or 102 has an access right. When the user has the access right, the server 100 can submit, not the document with the water-mark, but the original data to the client 101 or 102. In this case, a person who made the original data and stored the original data in the server 100, can obtain the original data from the server 100 again. Thereby, the person can renew the original data. Thus, this example both keeps the document data confidential and allows the maker of the original data to obtain the original data again.

While the term water-mark has been used herein to describe an access restricting mark, it is not limited to such. The term can also be used to e.g. identify the source of the content of document data, or to provide identifying information such as a trademark, logo, or identifying an other designation such as "draft" or "copy right". Moreover, the watermark can relate to authentication of the data, authorization of copying of the data, origin of the data, or access to the data, merely as non-limiting examples.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above-described embodiments, and various variations and modifications may be possible without departing from the scope of the present invention.

What is claimed is:

1. A server connected with a terminal apparatus via a network, the server comprising:
    a first memory configured to store original data without a water-mark;
    a second memory configured to store a first water-mark associated with a folder ID of a folder which includes the original data associated with a document ID and with a first user ID indicating a predetermined user, and to store a second water-mark associated with the same folder ID as the first water-mark and with a second user ID indicating a plurality of users including the predetermined user; and
    a controller configured, when the user requests the server to display the original data on a display of the terminal apparatus by inputting the document ID and the first user ID, to determine whether the first water-mark and the second water-mark are stored in the second memory with respect to the document ID and the first user ID, to transform the original data into image data, to select the first water-mark as a priority with respect to the second water-mark when the first water-mark and the second water-mark are stored in the second memory with respect to the folder ID and the first user ID, to add the selected first water-mark to the image data, and to transmit the image data with the selected first water-mark to the terminal apparatus and when the first watermark is determined to not be store in the second memory with respect to the document ID and the first user ID, to obtain the folder ID of the folder which includes the original data associated with the document ID.

2. An image management method for controlling a server connectable to a terminal apparatus via a network, the server including a first memory that stores original data without a watermark, a second memory that stores a first watermark associated with a folder ID of a folder which includes the original data associated with a document ID and with a first user ID indicating a predetermined user, and that stores a second watermark associated with the same folder ID as the first watermark and with a second user ID indicating a plurality of users including the predetermined user, the image management method comprising:
    determining, when the user requests the server to display the original data on a display of the terminal apparatus by inputting the document ID and the first user ID, whether the first watermark and the second watermark are stored in the second memory with respect to the document ID and the first user ID;
    transforming the original data into image data;
    selecting, when it is determined that the first watermark and the second watermark are stored in the second memory with respect to the folder ID and the first user ID, the first watermark as a priority with respect to the second watermark;
    adding the selected first watermark to the image data; and
    transmitting the image data with the selected first watermark to the terminal apparatus;
    obtaining, when it is determined that the first watermark is not stored in the second memory with respect to the document ID and the first user ID, the folder ID of the folder which includes the original data associated with the document ID.

* * * * *